United States Patent [19]

Korczak et al.

[11] Patent Number: 4,517,383

[45] Date of Patent: May 14, 1985

[54] ALKYLENE OXIDE ADDUCTS OF ANILINE HAVING REDUCED VISCOSITY

[75] Inventors: Alexander Korczak, Grosse Ile; William W. Levis, Jr., Wyandotte, both of Mich.

[73] Assignee: BASF Wyandotte Corporation, Wyandotte, Mich.

[21] Appl. No.: 510,441

[22] Filed: Jul. 5, 1983

[51] Int. Cl.³ .............................................. C07C 93/00
[52] U.S. Cl. .................................. 564/443; 521/159; 521/160; 521/170; 252/357
[58] Field of Search ......................... 564/443; 252/357

[56] References Cited

U.S. PATENT DOCUMENTS

| | | | |
|---|---|---|---|
| 2,937,087 | 5/1960 | Forsgard | 564/443 X |
| 3,462,492 | 8/1969 | Kober | 564/443 |
| 3,799,985 | 3/1974 | Erickson | 564/443 |
| 4,035,188 | 7/1977 | Yabuta et al. | 564/443 X |
| 4,209,609 | 6/1980 | Haas | 564/443 X |

*Primary Examiner*—Paul F. Shaver
*Attorney, Agent, or Firm*—William G. Conger; David L. Hedden; Joseph D. Michaels

[57] ABSTRACT

The subject invention relates to alkylene oxide adducts of aniline prepared by reacting an alkylene oxide with an aniline in the presence of preferably at least 0.1 part of alkali metal hydroxide per 100 parts by weight of aniline.

The resulting compositions may be used in the preparation of polyurethane products, such as rigid polyurethane foams, and may also be used as nonionic surfactants.

9 Claims, No Drawings

ALKYLENE OXIDE ADDUCTS OF ANILINE HAVING REDUCED VISCOSITY

BACKGROUND OF THE INVENTION

1. Field of the Invention

The subject invention relates to compositions which are alkylene oxide adducts of aniline. The compositions may be used in the preparation of polyurethane products and as nonionic surfactants.

2. Description of the Prior Art

It is known to make alkylene oxide adducts of aniline. However, these products are made by reacting the aniline with an alkylene oxide in the absence of catalysts. Moreover, their viscosities are too high to make them useful as surfactants and in the preparation of polyurethane products.

SUMMARY OF THE INVENTION

The subject invention relates to cogeneric mixtures of compounds having the following structural formula:

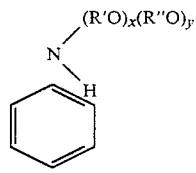

wherein
R' and R" are alkylene radicals, which may be the same or different, having from 2 to 4 carbon atoms;
$x$ is an integer from 0 to 50;
$y$ is an integer from 0 to 50; and
$x+y$ must be greater than 1 and less than 50.

The compounds, as can be seen from the structure, have at least one active hydrogen bonded directly to the nitrogen atom. These products have lower viscosities than those products wherein all of the active hydrogen atoms bonded to the nitrogen atoms have been oxyalkylated.

The compounds are prepared by reacting aniline with one or more alkylene oxides in the presence of preferably at least 0.1 part of alkali metal hydroxide catalyst per 100 parts of aniline at temperatures of preferably at least 100° C. It could not have been predicted that these reaction conditions would produce these unsymmetrical structures.

The subject compounds may be used in the preparation of polyurethane products, such as rigid polyurethane foams, and as nonionic surfactants.

DESCRIPTION OF THE PREFERRED EMBODIMENT

The alkylene oxide adducts of aniline are prepared, as was previously stated, by reacting aniline with one or more alkylene oxides in the presence of preferably at least 0.1 part of alkali metal hydroxide catalyst per 100 parts of aniline at temperatures of preferably at least 110° C. Those skilled in the art will know what equipment is needed and what precautions are necessary for preparing the subject polyols. Therefore, a detailed explanation of the process will not be provided except in the examples which follow.

Alkylene oxides which may be used to react with the aniline include ethylene oxide, propylene oxide, butylene oxide, and mixtures thereof. The alkylene oxides may be added individually or as mixtures to form heteric, blocked, or mixed polymers. The mole ratio of aniline to alkylene oxide may vary over wide ranges such as 1:2 but is preferably from 1:2 to 1:10.

Preferably used as the alkali metal hydroxide catalyst, because of costs and availability, are potassium or sodium hydroxide. The amount of catalyst used is preferably at least 0.1 part by weight per 100 parts by weight of aniline.

The reaction takes place at temperatures of preferably at least 100° C. Generally, however, it is more preferred to use temperatures of at least 125° C. in order to produce compositions with the desired viscosity.

There may be some unreacted aniline and impurities in the reaction product. However, these can be removed by distillation under reduced pressure or other appropriate separation techniques to isolate the desired product.

The resulting alkylene oxide adducts of aniline may be used as nonionic surfactants and in the preparation of polyurethane products.

Polyurethane products are prepared from the subject compositions, or blends of the subject compositions and customarily used polyols, by reacting them with an organic polyisocyanate. Organic polyisocyanates which can be used to prepare the polyurethane products are those customarily used and may be represented by the following formula:

$$R''(NCO)_z$$

wherein R" is a polyvalent organic radical which is either aliphatic, aralkyl, alkylaryl, aromatic or mixtures thereof, and z is an integer which corresponds to the valence of R" and is at least 2. Representative of the organic polyisocyanates contemplated herein includes, for example, aromatic diisocyanates such as 2,4-toluene diisocyanate, 2,6-toluene diisocyanate, mixtures of 2,4- and 2,6-toluene diisocyanate, crude toluene diisocyanate, diphenylmethane diisocyanate, crude diphenylmethane diisocyanate and the like; aromatic triisocyanates such as 4,4',4''-tri-phenylmethane triisocyanate, 2,4,6-toluene triisocyanates; aromatic tetraisocyanates such as 4,4'-dimethyldiphenylmethane-2,2',5,5'-tetraisocyanate, and the like; aralkyl polyisocyanates such as xylene diisocyanate, aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate. These polyisocyanates are prepared by conventional methods known in the art such as the phosgenation of the corresponding organic amine. Included within the usable isocyanates are modifications of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

As was indicated previously, the orgaic polyisocyanate is reacted with the subject compositions or blends of the subject compositions and polyols customarily used. By "polyols customarily used" is meant polyols such as hydroxyl-terminated polyesters; polyoxyalkylene polyether polyols, alkylene oxide adducts of organic compounds having at least 2 reactive hydrogen atoms such as amines, and thiols; and hydroxy-terminated acetals. The amount of these polyols used is such that from 10 to 90 parts by weight are present per 100 parts of polyol blend.

Any suitable hydroxy-terminated polyester may be used such as are obtained, for example, from the reaction of polycarboxylic acids of polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-butyl-$\alpha$-ethyl-glutaric acid, $\alpha,\beta$-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, $\alpha$-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-b 2-hydroxyethyl ether of hydroxyquinone, and the alkylene oxide adducts of the above-named polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology,* Vol. 7, pp. 257–262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314; 3,383,351 (Re. 28,715); 3,304,273; 3,652,639; and 3,823,201 (Re. 29,014).

As was previously mentioned, other suitable polyols which can be used in the reactive polyol composition of this invention include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two -SH groups such as 1,2-ethanedithiol, 1,2-propanedithiol, 1,3-propanedithiol, and 1,6-hexanedithiol; and alkenethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

In order to prepare a rigid polyurethane product, the organic polyisocyanate is reacted with the polyol component optionally in the presence of a blowing agent and preferably a catalyst such that the ratio of isocyanate groups of the organic polyisocyanate to active hydrogens of the polyol ranges from 1:0.8 to 1:1.20.

Blowing agents which may be employed in the present invention are well known to those skilled in the art. Representative blowing agents include water, fluorocarbons such as trichloromonofluoromethane, 1,1,1-trichloro-2,2,2-trifluoroethane, tetrafluoromethane, bromotrifluoromethane, chlorotrifluoromethane, dibromodifluoromethane, trichlorethylene, chloroform, carbon tetrachloride and low boiling hydrocarbons such as butane, pentane and hexane. Included are the blowing agents disclosed in U.S. Pat. No. 3,922,238.

Catalysts are also preferably employed. Catalysts which may be used include organometallic catalysts such as dibutyltin dilaurate, dibutyltin dioctoate, stannous dioctoate, lead octoate, and cobalt nephthenate; tertiary amine catalysts such as, triethylenediamine, 1,3,5-tris(3-dimethylaminopropyl)-s-hexahydrotriazine; and other catalysts customarily used in the preparation of polyurethane foams.

Other additives may also be included in the foam formulations. Included are surfactants such as the silicone surfactants, e.g., polyoxyalkylene-polyalkylsiloxane, and flame retardants such as tris(2-chloroethyl)-phosphate.

The examples which follow will provide a detailed description of how to make and use the subject polyols, but are not intended to limit the scope of the invention. The parts referred to in the examples are by weight and the temperatures are in degrees centigrade unless otherwise designated.

EXAMPLES 1-11

All of the compositions were prepared in a stainless steel autoclave. In order to prepare the subject compositions, the liquid aniline and potassium hydroxide were charged to the reactor. The reactor was then purged with nitrogen, pressure checked, heated to the indicated temperature, vented to 0 psig, sealed, and the contents were stirred for 30 minutes. Then the alkylene oxide(s) were added over 7-8 hours at less than 90 psig at the specified temperature. After reacting for 2-3 hours at the indicated temperature, the product was cooled to 30° C. before discharging. The work-up of the product was usually performed by stripping at 77° C. at less than 15 mm mercury for 1 hour to determine the percent of volatiles. In needed instances, the stripped product was neutralized by using phosphoric acid or it was treated with an absorbent to remove the alkaline catalyst. The viscosity of the product in cps was determined at 25° C.

The specific amount of catalyst used and the reaction temperature are provided in the table which follows. The table also provides data on the viscosity of the compositions. In the table, EO stands for ethylene oxide and PO stands for propylene oxide. The numbers represent the moles of alkylene oxide added per mole of aniline.

TABLE

| Example | PO | EO/PO* | Temp. °C. | KOH Parts/ 100 Parts Aniline | % Total Amino Content | % Tertiary Amino Content | Molecular Weight | Viscosity cps at 25° C. |
|---|---|---|---|---|---|---|---|---|
| 1 | 2 | | 110 | 0.22 | 2.74 | 0.33 | 511 | 240 |
| 2 | 2 | | 150 | 0.22 | 1.69 | 0.12 | 828 | 178 |
| 3 | 2 | | 110 | 0.44 | 1.78 | 0.13 | 787 | 249 |
| 4 | 2 | | 150 | 0.44 | 1.53 | 0.09 | 915 | 240 |
| 5 | 2 | | 175 | 0.44 | 1.61 | 0.12 | 869 | 224 |
| 6 | | 2/1 | 150 | 0.44 | 1.28 | 0.06 | 1094 | 290 |
| 7 | | 2/2 | 150 | 0.44 | 1.07 | 0.05 | 1308 | 342 |
| 8 | 4 | | 150 | 0.28 | 1.27 | 0.06 | 1102 | 305 |
| 9 | 1 | | 150 | 0.44 | 1.94 | 0.1 | 722 | 227 |
| 10 | 2 | | 150 | 0.44 | 1.8 | 0.34 | 778 | 227 |

*Added together to form a heteric
**NaOH used instead of KOH

The data in Table 1 show that if the teachings described herein are followed, it is possible to prepare alkylene oxide adducts of aniline having low viscosities. These low viscosities result because the adducts produced have unsymmetrical structures as is suggested by the data comparing the total amino content with the tertiary amino content.

COMPARISON EXAMPLE A

In order to illustrate the effects of using no catalyst, Example 4 was followed without the catalyst. The viscosity of the resulting product was 176,000 cps.

The embodiments of the invention in which an exclusive privilege or property is claimed are defined as follows:

1. A cogeneric mixture of compounds having the following structural formula:

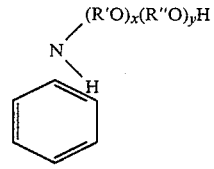

wherein
R' and R" are alkylene radicals which may be the same or different having from 2 to 4 carbon atoms;
$x$ is an integer from 0 to 50;
$y$ is an integer from 0 to 50; and
$x+y$ must be greater than 1 and less than 50.

2. The composition of claim 1 wherein R' and R" represent one or more ethylene groups, propylene groups, or mixtures thereof.

3. The composition of claim 2 wherein $x+y$ is an integer from 2 to 10.

4. A process for preparing a polyol composition which comprises reacting an alkylene oxide with aniline in the presence of at least 0.1 part of alkali metal hydroxide per 100 parts of aniline.

5. The process of claim 4 wherein potassium hydroxide is used as the alkali metal hydroxide to prepare the polyol.

6. The process of claim 5 wherein temperatures of at least 110° C. are used to prepare the polyol.

7. The process of claim 6 wherein from 0.2 part to 0.45 part of alkali metal hydroxide per 100 parts of aniline is used to prepare the polyol.

8. The process of claim 7 wherein from 2 to 10 moles of alkylene oxide are reacted per mole of aniline.

9. A polyol blend comprising from 10 to 90 parts by weight, based upon 100 parts by weight of the blend, of a polyoxyalkylene polyether polyol, and from 90 to 10 parts by weight of the polyol of claim 1.

* * * * *

UNITED STATES PATENT AND TRADEMARK OFFICE
CERTIFICATE OF CORRECTION

PATENT NO. : 4,517,383
DATED : May 14, 1985
INVENTOR(S) : Alexander Korczak et al It is certified that error appears in the above-identified patent and that said Letters Patent is hereby corrected as shown below:

Amend the structural formula at line 23 of col. 1 and the structural formula of claim 1 to read as follows:

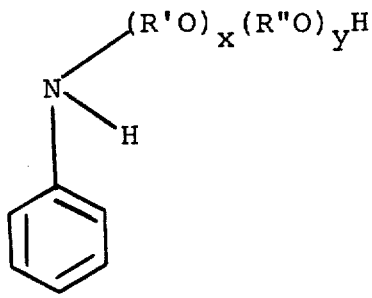

Signed and Sealed this

Eleventh Day of February 1986

[SEAL]

Attest:

DONALD J. QUIGG

Attesting Officer

Commissioner of Patents and Trademarks